United States Patent
Park et al.

(10) Patent No.: US 10,062,012 B1
(45) Date of Patent: Aug. 28, 2018

(54) FINDING PATTERNS IN A DESIGN BASED ON THE PATTERNS AND THEIR SURROUNDINGS

(71) Applicant: KLA-Tencor Corporation, Milpitas, CA (US)

(72) Inventors: Allen Park, San Jose, CA (US); Michael Lennek, San Jose, CA (US)

(73) Assignee: KLA-Tencor Corp., Milpitas, CA (US)

( * ) Notice: Subject to any disclaimer, the term of this patent is extended or adjusted under 35 U.S.C. 154(b) by 292 days.

(21) Appl. No.: 14/885,859

(22) Filed: Oct. 16, 2015

Related U.S. Application Data

(60) Provisional application No. 62/066,894, filed on Oct. 22, 2014.

(51) Int. Cl.
| | |
|---|---|
| *G06K 9/00* | (2006.01) |
| *G06K 9/62* | (2006.01) |
| *G06K 9/46* | (2006.01) |
| *G06T 7/00* | (2017.01) |
| *G06T 7/60* | (2017.01) |
| *G06K 9/52* | (2006.01) |

(52) U.S. Cl.
CPC ......... *G06K 9/6267* (2013.01); *G06K 9/4604* (2013.01); *G06K 9/52* (2013.01); *G06T 7/0004* (2013.01); *G06T 7/60* (2013.01); *G06T 2207/30148* (2013.01)

(58) Field of Classification Search
CPC ...... G06K 9/6267; G06K 9/4604; G06K 9/52; G06T 7/0004; G06T 7/60; G06T 2207/30148
See application file for complete search history.

(56) References Cited

U.S. PATENT DOCUMENTS

| 6,137,578 A * | 10/2000 | Ausschnitt .......... G03F 7/70625 356/399 |
|---|---|---|
| 6,902,855 B2 | 6/2005 | Peterson et al. |
| 7,418,124 B2 | 8/2008 | Peterson et al. |
| 7,570,796 B2 | 8/2009 | Zafar et al. |
| 7,570,797 B1 * | 8/2009 | Wang ................ G01N 21/9501 250/559.45 |
| 7,676,077 B2 | 3/2010 | Kulkarni et al. |
| 7,769,225 B2 | 8/2010 | Kekare et al. |
| 8,041,106 B2 | 10/2011 | Pak et al. |
| 8,213,704 B2 | 7/2012 | Peterson et al. |
| 8,664,594 B1 | 4/2014 | Jiang et al. |
| 8,692,204 B2 | 4/2014 | Kojima et al. |
| 8,698,093 B1 | 4/2014 | Gubbens et al. |
| 8,716,662 B1 | 5/2014 | MacDonald et al. |

(Continued)

*Primary Examiner* — Chan Park
*Assistant Examiner* — Elisa Rice
(74) *Attorney, Agent, or Firm* — Ann Marie Mewherter

(57) ABSTRACT

Methods and systems for finding patterns in a design for a specimen are provided. One system includes one or more computer subsystems configured for searching for a target pattern in a design for a specimen to thereby find multiple instances of the target pattern in the design. The one or more computer subsystems are also configured for separating the multiple instances of the target pattern into different groups based on information for surrounding patterns within a predefined window around the target pattern such that each of the different groups corresponds to a different combination of the target pattern and the surrounding patterns.

21 Claims, 6 Drawing Sheets

(56) References Cited

U.S. PATENT DOCUMENTS

| | | | |
|---|---|---|---|
| 2002/0027199 A1* | 3/2002 | Inada | G01N 23/04 |
| | | | 250/311 |
| 2003/0005390 A1* | 1/2003 | Takashima | G03F 1/36 |
| | | | 716/53 |
| 2005/0002554 A1* | 1/2005 | Schulze | G06T 7/001 |
| | | | 382/144 |
| 2008/0189673 A1* | 8/2008 | Ying | G03F 1/36 |
| | | | 716/52 |
| 2013/0278748 A1* | 10/2013 | Nakayama | G06K 9/00536 |
| | | | 348/87 |
| 2015/0265236 A1* | 9/2015 | Garner | A61B 6/5217 |
| | | | 600/425 |

* cited by examiner

FINDING PATTERNS IN A DESIGN BASED ON THE PATTERNS AND THEIR SURROUNDINGS

BACKGROUND OF THE INVENTION

1. Field of the Invention

This invention generally relates to methods and systems for finding patterns in a design for a specimen.

2. Description of the Related Art

The following description and examples are not admitted to be prior art by virtue of their inclusion in this section.

An integrated circuit (IC) design may be developed using a method or system such as electronic design automation (EDA), computer aided design (CAD), and other IC design software. Such methods and systems may be used to generate the circuit pattern database from the IC design. The circuit pattern database includes data representing a plurality of layouts for various layers of the IC. Data in the circuit pattern database may be used to determine layouts for a plurality of reticles. A layout of a reticle generally includes a plurality of polygons that define features in a pattern on the reticle. Each reticle is used to fabricate one of the various layers of the IC. The layers of the IC may include, for example, a junction pattern in a semiconductor substrate, a gate dielectric pattern, a gate electrode pattern, a contact pattern in an interlevel dielectric, and an interconnect pattern on a metallization layer.

Due to the interactions between different patterns and the processes used to fabricate them on a specimen, many fabrication (e.g., lithography) and quality control (e.g., inspection) processes are performed differently at different locations on a specimen such as a wafer depending on which patterns are or will be formed at the different locations. For example, an inspection process may be performed with a higher or lower sensitivity at locations on a wafer where a first pattern will be formed than at locations where other different types of patterns will be formed. As such, it has become important to know where in a design certain types of patterns (i.e., "patterns of interest") have been or will be formed. Therefore, recently, much work has been done to develop methods to accurately find specific patterns of interest in a design.

Currently used methods for pattern searching may include a pattern search that is based on the pattern (or geometries) that are confined by a bounding box or the selected pattern. Based on the defined candidate, either an exact match or a fuzzy match may be performed to search for instances of the pattern. In any case, the end result may be that the search result would have to have the same components bounded by the candidate pattern as drawn or selected.

While the search itself is satisfactory with the currently used methods, use of the result can be challenging depending on the subsequent process. For example, if the polygons neighboring the pattern for which the search is performed vary either in density or geometry, setting up a single inspection sensitivity for all sites of a given pattern type may generate varying detectability of defects in the sites. In one such example, a particularly shaped pattern surrounded by substantially dense structures and the same pattern surrounded by a sparsely patterned area would have different optical responses thereby requiring different set ups. In addition, the yield impact of a particularly shaped structure in many thin lines may be different than the same structure with a relatively large block or a sparse pattern next to it. Therefore, not leveraging the knowledge of neighboring structures can impact inspection sensitivity, defect sampling, inspection area set up, pattern grouping, etc.

Accordingly, it would be advantageous to develop systems and/or methods that do not have one or more of the disadvantages described above.

SUMMARY OF THE INVENTION

The following description of various embodiments is not to be construed in any way as limiting the subject matter of the appended claims.

One embodiment relates to a system configured to find patterns in a design for a specimen. The system includes an inspection subsystem that includes at least an energy source and a detector. The energy source is configured to generate energy that is directed to a specimen. The detector is configured to detect energy from the specimen and to generate output responsive to the detected energy. The system also includes one or more computer subsystems configured for searching for a target pattern in a design for the specimen to thereby find multiple instances of the target pattern in the design. The one or more computer subsystems are also configured for separating the multiple instances of the target pattern into different groups based on information for surrounding patterns within a predefined window around the target pattern such that each of the different groups corresponds to a different combination of the target pattern and the surrounding patterns. The system may be further configured as described herein.

Another embodiment relates to a computer-implemented method for finding patterns in a design for a specimen. The method includes the searching and separating steps described above. The method described above may be performed as described further herein. In addition, the method described above may include any other step(s) of any other method(s) described herein. Furthermore, the method described above may be performed by any of the systems described herein.

Another embodiment relates to a non-transitory computer-readable medium storing program instructions executable on a computer system for performing a computer-implemented method for finding patterns in a design for a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Other objects and advantages of the invention will become apparent upon reading the following detailed description and upon reference to the accompanying drawings in which.

Figure 1:
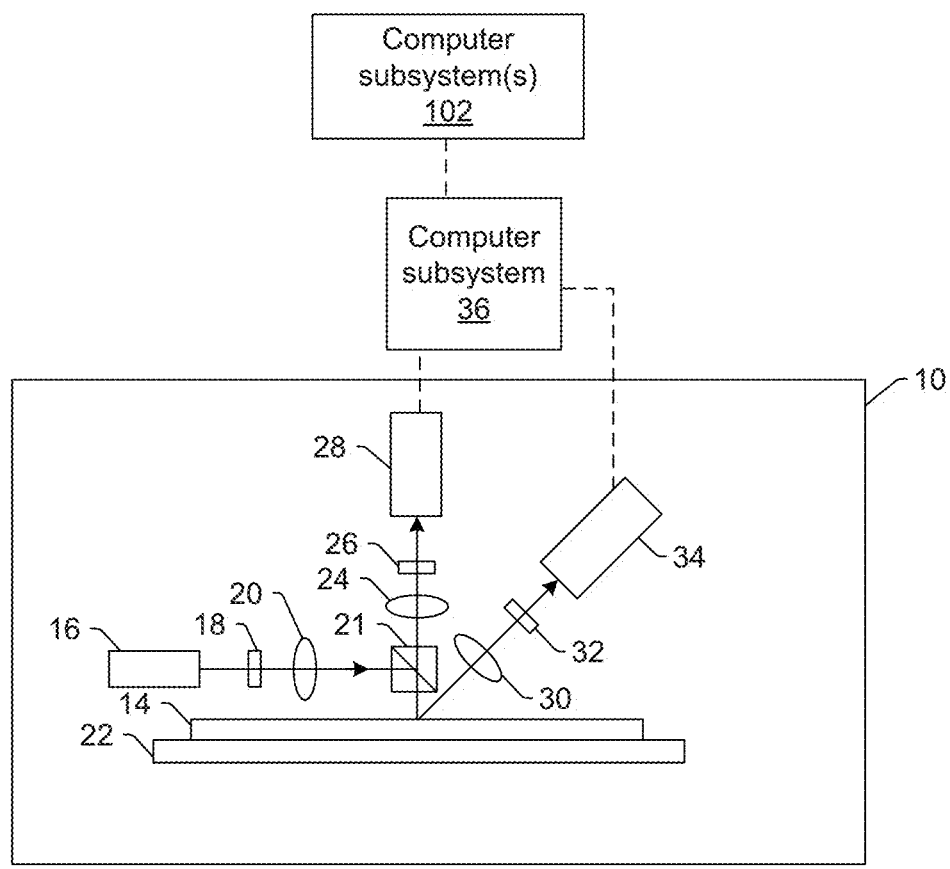
FIGS. 1-2 are schematic diagrams illustrating a side view of embodiments of a system configured to find patterns in a design for a specimen.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design" and "design data" as used herein generally refer to the physical design (layout) of an IC and data derived from the physical design through complex simulation or simple geometric and Boolean operations. The physical design may be stored in a data structure such as a graphical data stream (GDS) file, any other standard machine-readable file, any other suitable file known in the art, and a design database. A GDSII file is one of a class of files used for the representation of design layout data. Other examples of such files include GL and OASIS files and proprietary file formats such as RDF data, which is proprietary to KLA-Tencor, Milpitas, Calif. In addition, an image of a reticle acquired by a reticle inspection system and/or derivatives thereof can be used as a "proxy" or "proxies" for the design. Such a reticle image or a derivative thereof can serve as a substitute for the design layout in any embodiments described herein that use a design. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data.

In some instances, simulated or acquired images from a wafer or reticle can be used as a proxy for the design. Image analysis can also be used as a proxy for design analysis. For example, polygons in the design may be extracted from an image of a design printed on a wafer and/or reticle, assuming that the image of the wafer and/or reticle is acquired with sufficient resolution to adequately image the polygons of the design. In addition, the "design" and "design data" described herein refers to information and data that is generated by semiconductor device designers in a design process and is therefore available for use in the embodiments described herein well in advance of printing of the design on any physical wafers.

The "design" or "physical design" may also be the design as it would be ideally formed on the wafer. In this manner, a design or physical design described herein may not include features of the design that would not be printed on the wafer such as optical proximity correction (OPC) features, which are added to the design to enhance printing of the features on the wafer without actually being printed themselves. In this manner, in some embodiments, the design for the specimen used as described further herein may not include features of the design that will not be printed on the specimen.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a system configured to find patterns in a design for a specimen. In one embodiment, the specimen includes a wafer. In another embodiment, the specimen includes a reticle. The wafer and the reticle may include any wafer and reticle known in the art.

One embodiment of such a system is shown in FIG. 1. The system includes an inspection subsystem that includes at least an energy source and a detector. The energy source is configured to generate energy that is directed to a specimen. The detector is configured to detect energy from the specimen and to generate output responsive to the detected energy.

In one embodiment, the energy directed to the specimen includes light, and the energy detected from the specimen includes light. For example, in the embodiment of the system shown in FIG. 1, inspection subsystem 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to beam splitter 21, which directs the light to specimen 14 at a normal angle of incidence. The angle of incidence may include any suitable angle of incidence, which may vary depending on, for instance, characteristics of the specimen and the defects to be detected on the specimen.

The illumination subsystem may be configured to direct the light to the specimen at different angles of incidence at different times. For example, the inspection subsystem may be configured to alter one or more characteristics of one or more elements of the illumination subsystem such that the light can be directed to the specimen at an angle of incidence that is different than that shown in FIG. 1. In one such example, the inspection subsystem may be configured to move light source 16, optical element 18, and lens 20 such that the light is directed to the specimen at a different angle of incidence.

In some instances, the inspection subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by changing the spectral filter) such that different wavelengths of light can be directed to the specimen at different times. The illumination subsystem may have any other suitable configuration known in the art for directing the light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 1 as a single refractive optical element, it is to be understood that, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the inspection system may be configured to alter one or more of the elements of the illumination subsystem based on the type of illumination to be used for inspection.

The inspection subsystem may also include a scanning subsystem configured to cause the light to be scanned over the specimen. For example, the inspection subsystem may include stage 22 on which specimen 14 is disposed during inspection. The scanning subsystem may include any suitable mechanical and/or robotic assembly (that includes stage 22) that can be configured to move the specimen such that the light can be scanned over the specimen. In addition, or alternatively, the inspection subsystem may be configured such that one or more optical elements of the inspection subsystem perform some scanning of the light over the specimen. The light may be scanned over the specimen in any suitable fashion.

The inspection subsystem further includes one or more detection channels. At least one of the one or more detection channels includes a detector configured to detect light from the specimen due to illumination of the specimen by the inspection subsystem and to generate output responsive to the detected light. For example, the inspection subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the specimen. However, two or more of the detection channels may be configured to detect the same type of light from the specimen (e.g., specularly reflected light). Although FIG. 1 shows an embodiment of the inspection subsystem that includes two detection channels, the inspection subsystem may include a different number of detection channels (e.g., only one detection channel or two or more detection channels). Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), and time delay integration (TDI) cameras. The detectors may also include any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the inspection system may be signals or data, but not image signals or image data. In such instances, a computer subsystem such as computer subsystem 36 of the system may be configured to generate images of the specimen from the non-imaging output of the detectors. However, in other instances, the detectors may be configured as imaging detectors that are configured to generate imaging signals or image data. Therefore, the system may be configured to generate the images described herein in a number of ways.

It is noted that FIG. 1 is provided herein to generally illustrate a configuration of an inspection subsystem that may be included in the system embodiments described herein. Obviously, the inspection subsystem configuration described herein may be altered to optimize the performance of the system as is normally performed when designing a commercial inspection system. In addition, the systems described herein may be implemented using an existing inspection system (e.g., by adding functionality described herein to an existing inspection system) such as the 29xx/28xx series of tools that are commercially available from KLA-Tencor. For some such systems, the methods described herein may be provided as optional functionality of the inspection system (e.g., in addition to other functionality of the inspection system). Alternatively, the inspection system described herein may be designed "from scratch" to provide a completely new inspection system.

Computer subsystem 36 of the system may be coupled to the detectors of the inspection subsystem in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 36 may be coupled to computer subsystem(s) 102 (as shown by the dashed line in FIG. 1) by any suitable transmission media, which may include any suitable wired and/or wireless transmission media known in the art. Two or more of such computer subsystems may also be effectively coupled by a shared computer-readable storage medium (not shown).

Although the inspection subsystem is described above as being an optical or light-based inspection subsystem, the inspection subsystem may be an electron beam-based inspection subsystem. For example, in one embodiment, the energy directed to the specimen includes electrons, and the energy detected from the specimen includes electrons. In this manner, the energy source may be an electron beam source. In one such embodiment shown in FIG. 2, the inspection subsystem includes electron column 122, which is coupled to computer subsystem 124.

Figure 2:
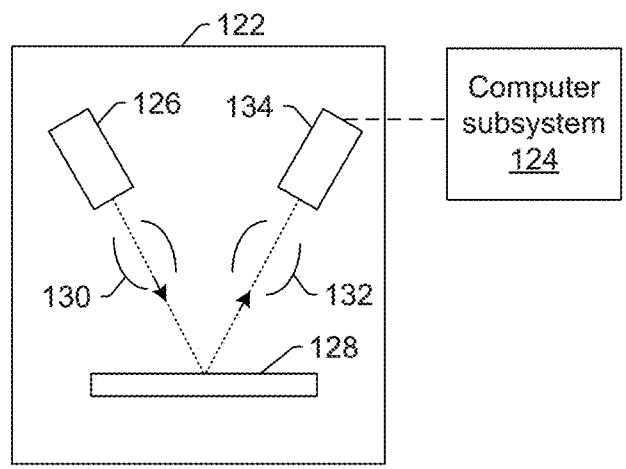

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam-based inspection subsystem may be configured to use multiple modes to generate images of the specimen (e.g., with different illumination angles, collection angles, etc.). The multiple modes of the electron beam-based inspection subsystem may be different in any image generation parameters of the inspection subsystem.

Computer subsystem 124 may be coupled to detector 134 as described above. The detector may detect electrons returned from the surface of the specimen thereby forming electron beam images of the specimen. The electron beam images may include any suitable electron beam images. Computer subsystem 124 may be configured to perform any of the functions described herein using the output of the detector and/or the electron beam images. Computer subsystem 124 may be configured to perform any additional step(s) described herein. A system that includes the inspection subsystem shown in FIG. 2 may be further configured as described herein.

It is noted that FIG. 2 is provided herein to generally illustrate a configuration of an electron beam-based inspection subsystem that may be included in the embodiments described herein. As with the optical inspection subsystem described above, the electron beam-based inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the eSxx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

The one or more computer subsystems are configured for searching for a target pattern in a design for the specimen to thereby find multiple instances of the target pattern in the design. In some instances, the target pattern may be defined by a user. For example, the one or more computer subsystems may be configured to request or receive information for the target pattern from a user. Although some target patterns are described and shown herein as including a single polygon (e.g., a "U" or "L" shaped polygon), the target pattern, in of itself, may include more than one polygon that together, in combination, are considered to be the target pattern. For example, the target pattern may include two "L" shaped polygons that have some specific spatial arrangement with respect to each other.

In addition, searching for the target pattern may include searching for only the exact target pattern but also with some variations such as rotation and mirroring. Searching for the target pattern may, however, also include searching for similar patterns using custom settings. The degree to which two different instances of a pattern can be determined to be "similar" to each other may vary depending on the target pattern and/or input from a user. However, any suitable method for determining how "similar" two patterns are to each other may be used to identify similar patterns for the embodiments described herein. A threshold may then be applied to the measure of how "similar" two different instances of a pattern are to each other to separate patterns that are considered to be "similar" enough to be different instances of the same pattern from patterns that are considered to not be "similar" enough to be different instances of the same pattern.

Searching for the target pattern as described herein is limited to the target pattern itself, i.e., without considering the larger context of the target pattern. Therefore, since the same structure may be placed in a design layout over and over in various neighborhoods of polygons, the multiple instances of the target pattern that are found by the searching may include different instances of the target pattern located in, near, or adjacent to different surrounding patterns.

Although the searching is described herein as being performed for "a target pattern," it is to be understood that the searching may be separately performed for different target patterns. For example, the design may be searched for a first target pattern, the design may then be searched for a second target pattern, the design may also be searched for a third target pattern, and so on until each designated target pattern has been searched for. In addition, searching for more than one target pattern may be performed simultaneously or sequentially. Therefore, the results of the searching may include multiple instances of a first target pattern, multiple instances of a second target pattern, etc. In a sense then, the results of the searching may include different bins or groups, each containing only the multiple instances for one of the target patterns. For example, a first group may include only instances of the first target pattern, a second group may include only instances of the second target pattern, and so on.

In one embodiment, the design that is searched is design data included in a design data file. In this manner, the searching may be performed in design space. The design data and the design data file may include any of those described herein. For example, searching for the target pattern may be performed using any of the design or design data described herein, e.g., a design layout.

In another embodiment, the design that is searched is information for the design obtained from a physical wafer on which at least a portion of the design is printed. In this manner, the searching may be performed in wafer space. For example, the information for the design may be obtained from relatively high resolution images or image data generated for the wafer by a wafer inspection system operating in a relatively high resolution mode or a defect review tool such as a scanning electron microscope (SEM) or an optical defect review tool. The space in which the searching is performed may, however, include any other suitable space such as reticle space which may be particularly the case when the specimen is a reticle.

Figure 3:
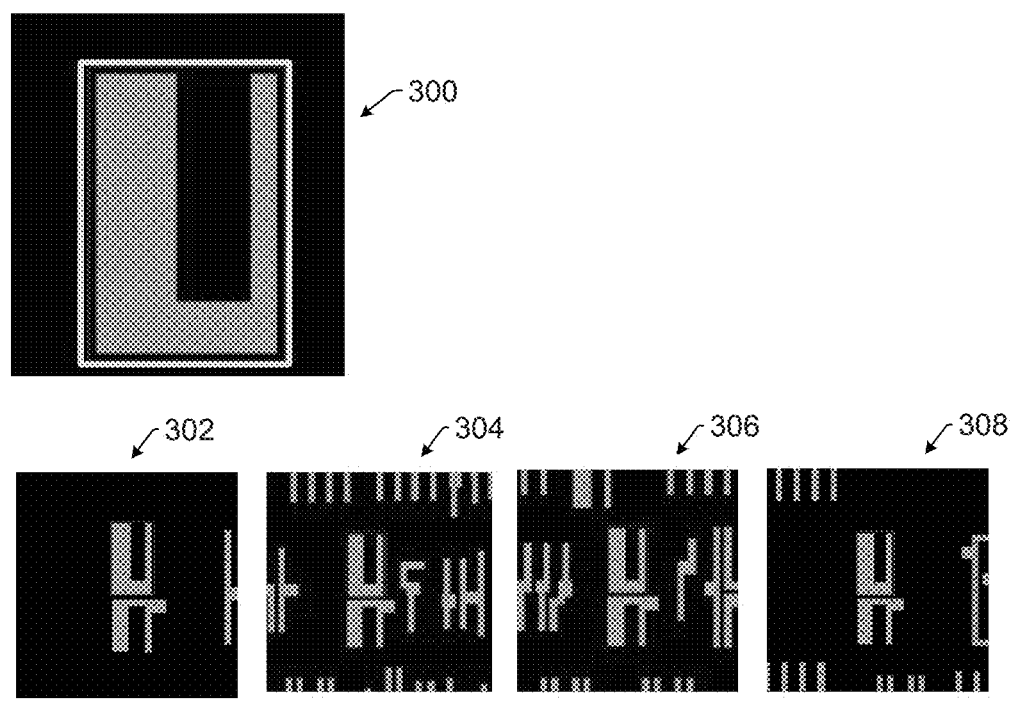
FIGS. 3-4 are schematic diagrams illustrating different results that can be generated by searching a design for different patterns.
Figure 4:
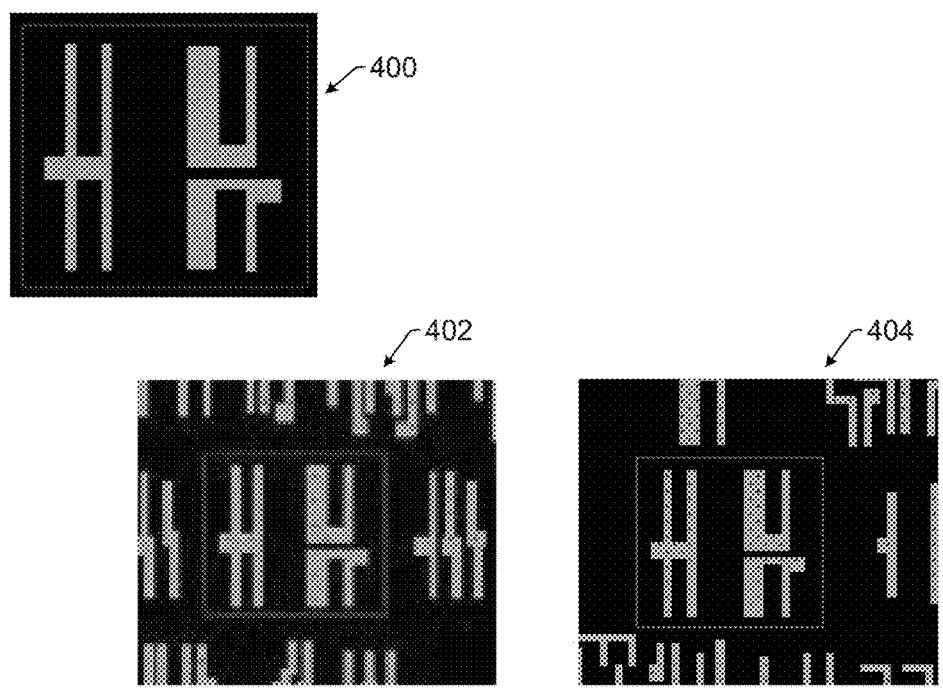

The results of the searching described above may not necessarily provide suitable results depending on what the intended use of the results is. For example, the area defined by the pattern search (e.g., the area of the target pattern) may be too small to estimate the optical response of a detector of an inspection subsystem for the target pattern. In one such example, as shown in FIG. 3, target pattern 300 may be used for searching in a design for any instances of this target pattern. As shown by different instances 302, 304, 306, and 308 of the target pattern found in the design, various surrounding patterns may be found in the same field of view of an inspection system. However, using a larger area for the target pattern search may fail to identify all occurrences of the target pattern due to variance in the pattern surroundings. For example, as shown in FIG. 4, target pattern 400 may be used for searching in a design for any instances of this target pattern. As shown in FIG. 4, target pattern 400 includes the target pattern of FIG. 3 as well as additional patterns surrounding the target pattern shown in FIG. 3. Therefore, the target pattern shown in FIG. 4 is larger than that shown in FIG. 3 in that it includes more patterns than the smaller target pattern of FIG. 3. As shown by different instances 402 and 404 in FIG. 4, even though target pattern 400 is larger, the results of such searching using target pattern 400 may also include different instances of the target pattern with different surrounding patterns. However, since target pattern 400 is larger, those different surrounding patterns may be located outside of the field of view of the inspection system when the field of view is centered on target pattern 400.

Using a smaller target pattern, e.g., that includes only the target pattern and no surrounding patterns, for searching a design will therefore find a substantially larger number of instances of the target pattern in the design. Therefore, using a smaller area candidate will allow more sites to be detected but the purity of the neighboring patterns in the search results will be substantially low. In contrast, using a larger area candidate will limit the ability to detect all occurrences of the pattern.

The one or more computer subsystems are also configured for separating the multiple instances of the target pattern into different groups based on information for surrounding patterns within a predefined window around the target pattern such that each of the different groups corresponds to a different combination of the target pattern and the surrounding patterns. In this manner, the embodiments described herein provide a method of pattern matching (or searching) using design layout that includes contexts around the target patterns. In particular, as described further herein, separating the multiple instances of the target pattern may be performed based on variation in the patterns surrounding the target pattern such that instances of the target pattern surrounded by different patterns are separated into different groups while instances of the target pattern surrounded by the same or substantially similar patterns are separated into the same group. With the embodiments described herein, pattern search is not limited to the contents in the target pattern area, but would further classify the data for improved consumption by subsequent processes. The embodiments described herein, therefore, in a sense, decouple the target pattern from the searching, finding, or matching criteria. In particular, the embodiments described herein, in a way, decouple target patterns and the final results by considering neighboring polygons using a larger context surrounding the target pattern.

Although the term "surrounding patterns" is used herein, the term is not meant to refer to only patterns that actually surround an entirety of the target pattern. Instead, the term "surrounding patterns" is used to indicate patterns that are near the target pattern in the sense that they are within the predefined window. In this manner, the "surrounding patterns" may be located only on one side of the target pattern. In addition, the "surrounding patterns" may be located on all sides of the target pattern such that the surrounding patterns effectively enclose the target patterns, although that is not necessarily the case.

Figure 5:
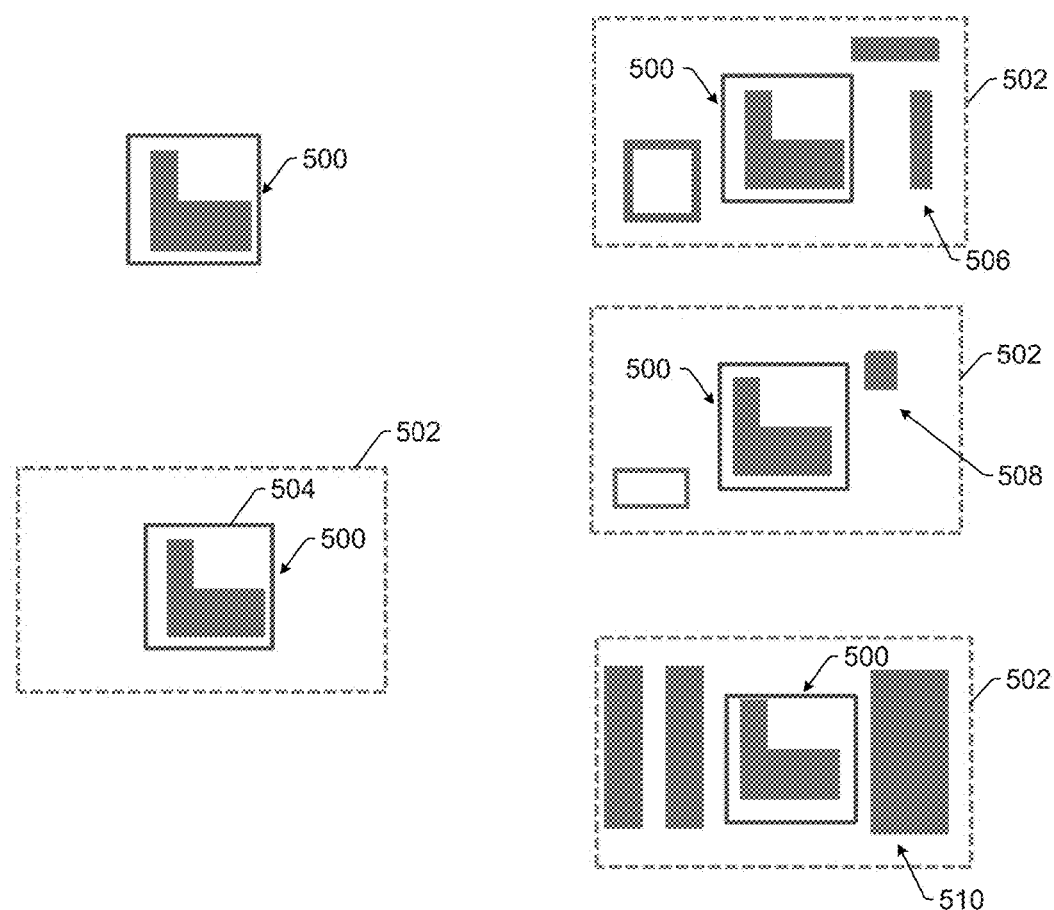
FIG. 5 is a schematic diagram illustrating one embodiment of a target pattern, a predefined window around the target pattern, and different combinations of the target pattern and surrounding patterns.

In one embodiment of separating the multiple instances, as shown in FIG. 5, target pattern 500 may be used for the searching. Predefined window 502 is an expanded area that may be defined around the target pattern. As shown in FIG. 5, the predefined window may have different proportions than the target pattern. For example, bounding box 504 surrounding the target pattern may have roughly square proportions while the predefined window may have rectangular proportions. However, the predefined window may have the same proportions as the target pattern. In addition, although the target pattern is shown in FIG. 5 as being roughly centered in the predefined window, the target pattern does not necessarily need to be centered in the predefined window.

Separating the multiple instances of the target pattern may then be performed based on information for any surrounding patterns within predefined window 502. Different groups of the multiple instances may then be generated. Each of the different groups may correspond to only one combination of the target pattern and one of the different surrounding patterns. For example, group 1 may correspond to and include only combinations of the target pattern and the surrounding patterns having first characteristics, group 2 may correspond to and include only combinations of the target pattern and the surrounding patterns having second characteristics, which are different from the first characteristics, and so on. In one such example, as shown in FIG. 5, a first group may include instances of target pattern 500 in combination with surrounding patterns 506. A second group may include only instances of target pattern 500 in combination with surrounding patterns 508, and a third group may include only instances of target pattern 500 with surrounding patterns 510. As shown in FIG. 5, surrounding patterns 506, 508, and 510 may be different in a number of different ways (e.g., size, shape, orientation, location, etc.), but the surrounding patterns corresponding to the different groups may be different in any of the other ways described herein. In addition, although each of the surrounding patterns is shown in FIG. 5 as including some patterned features or polygons, one of the different groups may correspond to instances of the target pattern in which no surrounding patterns are formed within the predefined window. Furthermore, although three different groups are shown in FIG. 5, obviously, the number of the different groups will vary depending on the different types of surrounding patterns within the predefined window.

In some instances, the computer subsystem(s) may be configured to receive or request information for the predefined window around the target pattern and/or the surrounding patterns. In this manner, the predefined window and/or the surrounding patterns may be defined by a user. The user may therefore set up proximity conditions such as area of consideration. Alternatively, the predefined window and/or the surrounding area may be defined automatically by the computer subsystem(s). The proximity conditions may also include any of various methods that may be used to define the grouping based on the larger context. Such methods include, but are not limited to, exact pattern matching, similar pattern matching, polygon count, polygon density, etc.

Figure 6:
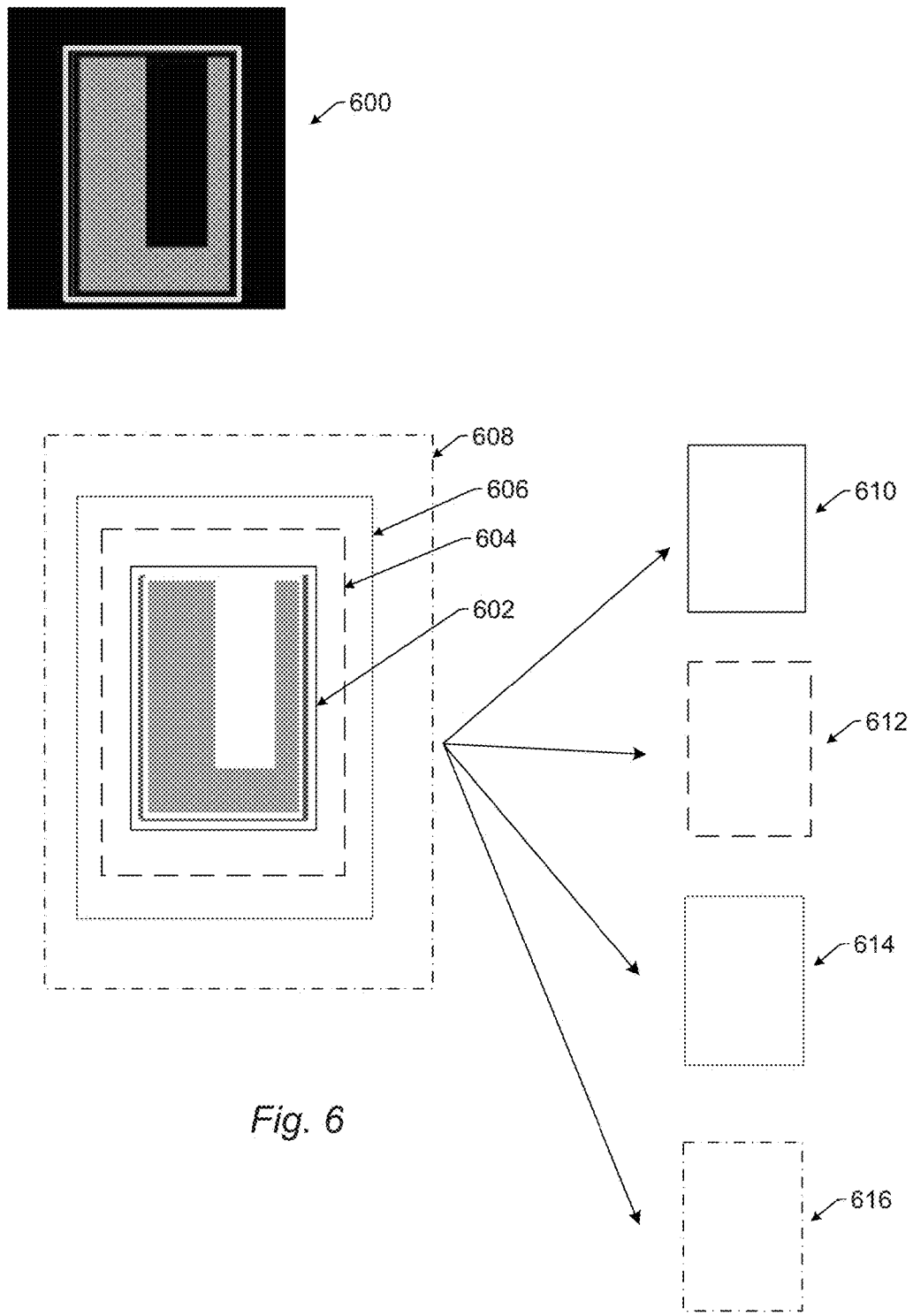
FIG. 6 is a schematic diagram illustrating one embodiment of a target pattern, different characteristics for patterns surrounding the target pattern, and different groups into which different combinations of the target pattern and the surrounding patterns can be separated.

In one such example, a user may define target pattern 600, as shown in FIG. 6. The user may also define different settings to be used for the separating described herein. For example, the user may setup different proximity conditions 602, 604, 606, and 608. The proximity conditions shown in this figure may be different sizes of user-defined larger context for regrouping (i.e., different sizes of the predefined windows). However, the proximity conditions may be any other proximity conditions described herein. Based on these proximity conditions, the searching may produce four different groups 610, 612, 614, and 616, each of which corresponds to one of the different proximity conditions. For example, group 610 may correspond to proximity conditions 602, group 612 may correspond to proximity conditions 604, and so on. In this manner, the results of one pattern search can be classified or separated based on the neighboring geometries.

In one embodiment, the surrounding patterns are on the same level of the design as the target pattern. In addition, the surrounding patterns may include only patterns that are on the same level of the design as the target pattern (i.e., not patterns on levels of the design other than the one in which the target pattern is included). In this manner, the target patterns and the surrounding patterns may be formed in the same processes performed on the wafer. In addition, the target pattern may not be above or below the surrounding patterns.

In another embodiment, at least a portion of the surrounding patterns are on a level of the design other than a level on which the target pattern is located. For example, the information for the surrounding patterns may include one or more rules based on one or more layers previously formed on the specimen (i.e., below the layer on which the target pattern is included) and/or one or more layers to be subsequently formed on the specimen (i.e., above the layer on which the target pattern is included). One example of such a rule may be written to separate instances of the target pattern in the presence of patterned features such as vias from instances of the target pattern in the absence of vias within a specified tolerance.

In some embodiments, the information for the surrounding patterns includes a density, geometry (or geometric pattern), complexity, vertex count, statistic of perimeters of polygons, mask layer, size, type of polygons, number of polygons, or optical property of the surrounding patterns. In some instances, a user may set up proximity conditions such as pattern density, pattern complexity, and mask layer. In this manner, the embodiments described herein may be configured to separate the search result based on various attributes such as surrounding pattern density, type of polygons, complexity of features, etc. For example, the information for the surrounding patterns may include density of patterns around the target pattern. In another example, the information for the surrounding patterns may include one or more geometric rules. In an additional example, the information for the surrounding patterns may include complexity of features. In a further example, the information for the surrounding patterns may include shapes. The optical property of the surrounding patterns may include, for example, brightness, contrast, etc. In addition, the information for the surrounding patterns may include two or more of the types of information described above. In this manner, the separating may be performed based on a combination of features or characteristics. For example, the target patterns can be simply separated based on overall pattern density of surrounding polygons or a complex formula based on two or more attributes such as polygon count, density, median polygon size, etc. can be used to separate the target pattern instances based on their surrounding patterns.

In a further embodiment, the information for the surrounding patterns includes values for two or more characteristics of the surrounding patterns. For example, the two or more characteristics may include any of the characteristics described above and the information that is used to separate the surrounding patterns may be different values for the characteristics. In one such example, the surrounding patterns having different values for pattern density may be used to separate the multiple instances into different groups such that the surrounding patterns in one group have one or more first values for the pattern density while the surrounding patterns in another group have one or more second values for the pattern density. Other values of other characteristics may be used to separate the multiple instances in a similar manner. In addition, the values of the characteristics used to separate the multiple instances may include quantitative values (such as a density below a certain numerical value) and/or qualitative values such as whether or not there are surrounding patterns in the predefined window around the target pattern.

In an additional embodiment, separating the multiple instances includes applying one or more rules to the information for the surrounding patterns. For example, the results of the searching may be classified based on pre-defined rules. The rules, therefore, may be written based on the information for the surrounding patterns. One such example may be a rule written for separating target patterns whose surrounding patterns include zero polygons into one group and separating target patterns whose surrounding patterns include one or more polygons into another group. The one or more rules may have any suitable format and may be applied to the information for the surrounding patterns in any suitable manner.

Separating the multiple instances in this manner is not necessarily performed based on specific information about the patterns included in the surrounding patterns. In other words, the input to separating the multiple instances in this manner is not necessarily polygons that are to be matched via pattern matching or some other method. Instead, separating the multiple instances in this manner may be performed without knowledge of the specific patterns in the surrounding patterns. In other words, the rules that are applied to the information for the surrounding patterns may identify one or more instances of surrounding patterns that were unknown prior to applying the rules. Therefore, in a sense, separating the multiple instances may include performing discovery of the surrounding patterns.

In this manner, the computer subsystem(s) may essentially reclassify the results of the searching step based on the larger context around the target pattern. For example, the target pattern may have varying surrounding polygons. The target pattern+surrounding patterns can be reclassified by using one or more of the following characteristics of the surrounding patterns: pattern density, polygon count, vertex count, similar polygons, statistics of perimeter values among the surrounding polygons, or any of the other surrounding pattern characteristics described herein. Input from a user may be used to define how to reclassify the target pattern instances based on the target pattern+surrounding patterns. Furthermore, although the classification may be based on user input and/or rules determined based on user input, the computer subsystem(s) may be further configured for performing some type of auto-learning to separate and discriminate between different types of surrounding patterns.

In one embodiment, separating the multiple instances includes performing pattern matching based on the target pattern in combination with the surrounding patterns. Pattern searching may be performed using exact or similarity search. In this manner, pattern matching performed using the larger context surrounding a target pattern may be used to separate the multiple instances of the target pattern into different groups. In some instances in which pattern matching is performed, the different types of surrounding patterns would have to be known prior to separating the multiple instances. In other words, without knowing what the surrounding patterns might look like, pattern matching may not be possible. Therefore, unlike some other approaches described herein for separating the multiple instances, the input to the separating of the multiple instances may include specific patterns or pattern types that are to be searched for within the predefined window.

In another embodiment, the information for the surrounding patterns includes values for characteristics of the surrounding patterns, and separating the multiple instances includes binning the multiple instances into the different groups based on the values for the characteristics such that each of the different groups corresponds to only a subset of the values for the characteristics of the surrounding patterns. The values for the characteristics may include any values of any characteristics described herein. In this manner, each of the different groups may include at least some of the multiple instances of the target pattern with surrounding patterns having one or more different values of the characteristics.

In some embodiments, separating the multiple instances includes binning the multiple instances into the different groups based on the information for the surrounding patterns and binning the multiple instances in one of the different groups into two or more subgroups based on additional information for the surrounding patterns. In this manner, the embodiments described herein may group the instances in one of the different groups into two or more secondary groups or subgroups. As such, separating the multiple instances may include multi-stage binning that enables identification of critical pattern types by grouping and further refining the grouping based on larger or different context.

Figure 7:
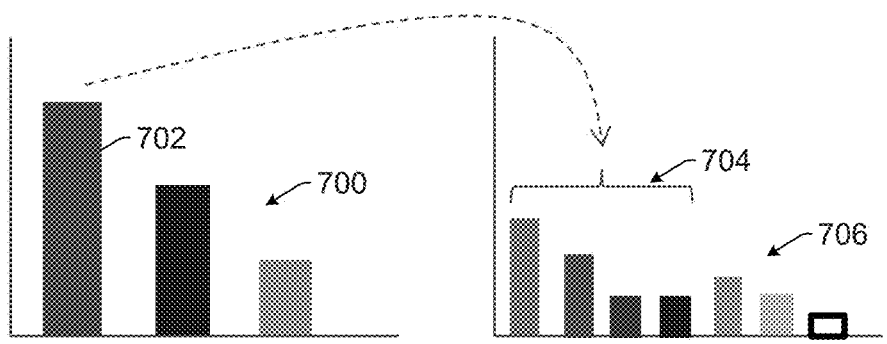
FIG. 7 is a schematic diagram illustrating results of separating multiple instances of a target pattern into different groups.

In one such embodiment, as shown in FIG. 7, results of binning the multiple instances into the different groups may produce pareto chart 700 in which the number of the multiple instances in each of the different groups is shown on the y axis as a function of the different groups on the x axis. Therefore, each of the different groups and each of the bars shown in the pareto chart corresponds to a different combination of a target pattern and one of various surrounding patterns. As further shown in this figure, the multiple instances in one of the different groups may be further separated into different subgroups based on one or more characteristics of the surrounding patterns in the instances included in the group. For example, the instances included in the different group corresponding to bar 702 in pareto chart 700 may be further separated into subgroups 704 as shown in pareto chart 706. Groups corresponding to other bars shown in pareto chart 700 may or may not be separated into subgroups in a similar manner.

The different groups may, therefore, be generated based on one characteristic of the surrounding patterns (e.g., complexity) and then one or more of the different groups may be separated into different subgroups based on a different characteristic of the surrounding patterns (e.g., number of polygons). In another example, one group may be generated based on pattern density using the larger context around the target pattern, and the group may be further separated into subgroups using pattern complexity such as number of vertices, perimeter of polygons, or polygon count. Any combination of two or more of the characteristics of the surrounding patterns described herein may be used to first separate the multiple instances into groups and then to separate the groups into subgroups. In addition, if more than one of the different groups is separated into subgroups, the characteristics used to separate two or more of the different groups may be the same or different. For example, two different groups generated based on one characteristic of the surrounding patterns (e.g., complexity) can both be separated into subgroups based on different characteristics of the surrounding patterns (e.g., number of polygons for one group and orientation of polygons for another group).

The multiple instances may be separated into groups and subgroups in similar ways using different predefined windows. For example, a first predefined window around the target pattern may be used to separate the multiple instances into groups, and then a second predefined window around the target pattern may be used to separate one or more of the groups into subgroups. The predefined window used to separate the multiple instances into groups may be smaller or larger than the predefined window used to separate the multiple instances into subgroups. For example, one predefined window may be used to separate the multiple instances into groups and then pattern search may be performed based on surrounding patterns outside of the predefined window to separate the groups into subgroups.

Figure 8:
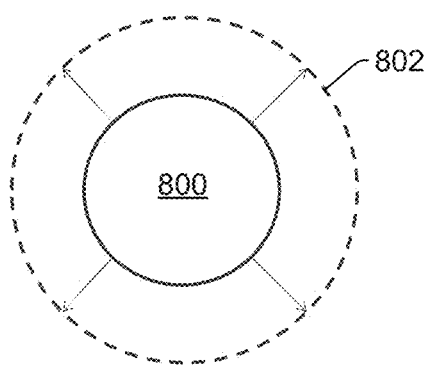
FIGS. 8 and 9 are schematic diagrams illustrating different predefined windows around a target pattern area.
Figure 9:
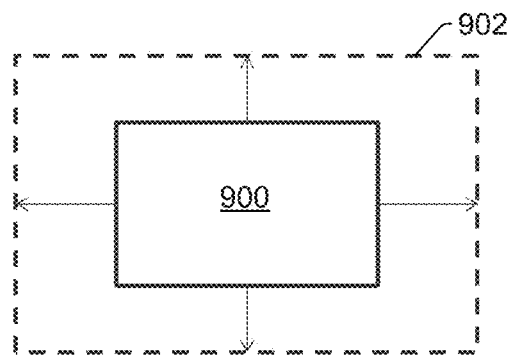

FIGS. 8 and 9 illustrate embodiments of such predefined windows. For example, as shown in FIG. 8, predefined window 800 around a target pattern (not shown in FIG. 8) may be used to separate multiple instances of the target pattern into different groups. Predefined window 802 around predefined window 800 may then be used to separate one or more of the different groups into different subgroups. Therefore, information for surrounding patterns in the vicinity outside of predefined window 800 and located in predefined window 802 may be used to separate one or more of the groups into different subgroups. In a similar manner, as shown in FIG. 9, predefined window 900 around a target pattern (not shown in FIG. 9) may be used to separate multiple instances of the target pattern into different groups. Predefined window 902 around predefined window 900 may then be used to separate one or more of the different groups into different subgroups. Therefore, information for surrounding patterns in the vicinity outside of predefined window 900 and located in predefined window 902 may be used to separate one or more of the groups into different subgroups. As shown in FIGS. 8 and 9, the predefined window and the expanded search area may have different shapes such as circular and rectilinear. However, the predefined window and the expanded search area may have any other suitable shape such as polygonal.

In addition, one of the predefined windows used to separate the multiple instances into groups and then subgroups may or may not be wholly within (or wholly surrounded by) another of the predefined windows. For example, one predefined window may be primarily to one side of the target pattern while another predefined window may be primarily to the opposite side of the target pattern. In another example, one predefined window may be for only surrounding patterns on the same layer as the target pattern, while another predefined window may be for only surrounding patterns on a different layer than the target pattern.

In a further embodiment, the one or more computer subsystems are further configured for determining one or more characteristics of the multiple instances in at least one of the different groups based on all of the multiple instances in the at least one of the different groups. For example, the embodiments described herein may be configured to relatively quickly determine the relative frequency of differing surrounding design contexts around a specified target pattern. The relative frequency of one combination of a target pattern and one of various surrounding patterns may be determined in any suitable manner (e.g., by comparison of the number of instances of that combination of target pattern+surrounding pattern vs. total number of instances of just target pattern). In addition, the embodiments described herein may be configured to determine which of the different groups (or subgroups) are systematic (or potential systematic) and which of the different groups (or subgroups) are random. For instance, groups (or subgroups) that appear in relatively large numbers may be designated as systematic while groups (or subgroups) that appear in relatively low numbers may be designated as random.

Unlike the embodiments described herein, a pattern search can be performed based on a relatively small target pattern. Then, the result can be processed through unsupervised binning to group the target patterns based on neighboring polygons. Once this is understood, a pattern library can be generated to regroup the pattern search result based on the variations of polygons in the vicinity. However, with many pattern candidates and more than 30 or so different neighboring pattern backgrounds, the amount of manual labor intensifies substantially quickly, resulting in an impractical solution.

The results of the separating may be passed on to one or more subsequent operations such as those described further herein.

In one embodiment, the one or more computer subsystems are further configured for setting up an inspection process for the specimen based on results of separating the multiple instances. For example, weak spots or hot spot pattern areas are often printed with different neighboring polygons and the embodiments described herein can be used to help optimize both inspection and any other optical analysis applied to the results. Setting up the inspection process may include setting any one or more parameters of the inspection process, which may include output generation (e.g., optical or electron beam) parameters and/or output processing parameters (e.g., image processing, defect detection algorithm and/or method, etc.). In one example, the information about the different groups and information for the instances of the combinations of the target pattern and the surrounding patterns included therein may be used to setup inspection areas (e.g., care areas or where to inspect areas). Since the larger context of the target pattern, i.e., the surrounding patterns, can have an impact on the yield relevance of the target pattern, determining inspection parameters such as care areas based on the results of separating the multiple instances may produce more yield relevant inspection parameters such as more yield relevant care areas. In this manner, inspection can only focus on (or can focus more on) the yield relevant sites.

In another embodiment, the one or more computer subsystems are further configured for setting up an inspection process for the specimen based on results of separating the multiple instances and information for how the surrounding patterns affect the output generated by the detector at locations of the multiple instances on the specimen. For example, the embodiments described herein may be configured to estimate the optical response for each target pattern instance based on the surrounding context. In particular, target pattern instances whose surrounding patterns are relatively large polygons would produce a different background noise level than target pattern instances that have no surrounding patterns. Therefore, by filtering target pattern instances based on the surrounding polygons that have similar expected optical response, target pattern instances that will have similar expected optical responses can be processed using the same inspection parameters while target pattern instances having different expected optical responses can be processed using different inspection parameters. For example, target pattern instances whose surrounding patterns will make their expected optical responses relatively noisy can be inspected with a lower sensitivity while target pattern instances whose surrounding patterns will make their expected optical responses relatively quiet can be inspected with a higher sensitivity. Other inspection parameters can be altered based on the expected optical responses of the target pattern instances plus their surrounding patterns in a similar manner. In this manner, overall noise in the inspection results can be reduced.

In a further embodiment, the one or more computer subsystems are further configured for setting up an inspection process for the specimen based on results of separating the multiple instances and information for yield impact of the different combinations of the target pattern and the surrounding patterns on a device fabricated using the design. For example, as described further herein, the surrounding patterns for any given target pattern instance can make that target pattern instance more or less important to the yield of the device fabrication. Therefore, based on the yield impact of the target pattern plus its various surrounding patterns, the inspection parameters can be changed such that target pattern instances that are more relevant to the yield can be inspected with a higher sensitivity while target pattern instances that are less relevant to the yield can be inspected with a lower sensitivity. The inspection sensitivity of the inspection process can be changed depending on the yield impact of the different instances of the target pattern in any suitable manner (e.g., by changing one or more parameters of a defect detection method and/or algorithm that is applied to output of a detector of an inspection subsystem).

In some embodiments, the one or more computer subsystems are further configured for setting up an inspection process for the specimen based on results of separating the multiple instances such that at least one of the different groups of the multiple instances is inspected with a different sensitivity than others of the different groups. Setting up the inspection process in this manner may be performed as described further herein.

In another embodiment, the one or more computer subsystems are further configured for setting up a process to be performed on the specimen by an additional system based on results of separating the multiple instances. For example, the embodiments described herein may be performed by a number of different tools, which can be configured as described herein, for a number of different processes. In one such example, the computer subsystem(s) of an electronic design automation (EDA) tool may be configured as described herein and the results of the searching and separating described herein may be used to generate critical areas. In another such example, the results of the searching and separating described herein may be used to perform a pattern search for verifying hot spots. Such hot spot verification may be performed by a review tool. Therefore, in some instances, the one or more computer subsystem(s) of a defect review tool may be configured as described herein. The process to be performed on the specimen may also include electron beam review and/or other electrical or analytical work.

In an additional embodiment, the one or more computer subsystems are further configured for combining two or more of the different groups based on expected output of the detector for the different combinations of the target pattern and the surrounding patterns in the different groups. For example, the embodiments described herein provide flexibility for combining and separating pattern search results based on user definition and/or inspection tool requirements. In addition, the embodiments described herein may be configured to perform an integrated one step operation to search, combine, and redistribute pattern candidates.

Combining and/or separating the target pattern+surrounding pattern instances may be performed for different uses. For example, it may be useful to separate the target patterns based on their surrounding patterns to get a better sense of the environment in which the target pattern is located. At the same time, it may be useful to group the target pattern instances that have different surrounding patterns, which may exhibit similar responses from an inspection perspective. In addition, it may be useful to separate the target patterns based on surrounding patterns in one instance and useful to combine target patterns having different surrounding patterns in another instance. For example, inspection output (e.g., signals, images, etc.) may be generated based on the smaller area of just the target pattern (and not the surrounding pattern) while the inspection output may be classified based on the larger context for reducing noise in the output due to the surrounding patterns. In another example, the target patterns may be reclassified based on their larger contexts to enable identification of a critical pattern of interest (in this case it would be the target pattern plus the surrounding pattern), for example, when the surrounding pattern impacts the quality of printing of the target pattern.

In one embodiment, the one or more computer subsystems are further configured for correlating the output generated by the detector at one or more of the multiple instances to output generated by a different system, and the correlating is separately performed for each of the different groups. For example, with the tightening integration of design, optical inspection data, and SEM data, an approach like the ones described herein is basically necessary for any attempt to find correlations between optical data and SEM data simply because the optical signal will be a mixture of several different design contexts with a priori differing characteristic optical responses. This mixture of different design contexts can obscure correlations between SEM and optical measurements. In particular, different surrounding patterns can impact the optical output for a target pattern differently than they impact the SEM output. Therefore, trying to find a correlation between optical and SEM output for multiple instances of a target pattern without considering the larger context of the target pattern may fail. However, trying to find a correlation between optical and SEM output for only instances of the target pattern whose larger context is substantially the same may be successful. As such, correlating optical and SEM output may be performed in any suitable manner and separately for each of the different groups or subgroups identified by the embodiments described herein.

In some embodiments, the one or more computer subsystems are further configured for ranking the different groups based on information from a process window qualification (PWQ) inspection performed for the design. PWQ inspection may be performed as described in U.S. Pat. No. 6,902,855 to Peterson et al. issued on Jun. 7, 2005, U.S. Pat. No. 7,418,124 to Peterson et al. issued on Aug. 26, 2008, U.S. Pat. No. 7,769,225 to Kekare et al. issued on Aug. 3, 2010, U.S. Pat. No. 8,041,106 to Pak et al. issued on Oct. 18, 2011, and 8.213.704 to Peterson et al. issued on Jul. 3, 2012, which are incorporated by reference as if fully set forth herein. The embodiments described herein may include any step(s) of any method(s) described in these patents and may be further configured as described in these patents. A PWQ wafer may be printed as described in these patents.

In one such embodiment, each group (or subgroup) may be ranked based on information about the defects that were detected by PWQ in the instances of the target pattern corresponding to each group (or subgroup) as well as the proximity of the process conditions used to form the instances of the target pattern corresponding to each group (or subgroup) to nominal process conditions. In one such example, the PWQ inspection may be performed such that instances of the target pattern in a first group are formed on the specimen at different process conditions and then locations of the instances of the target pattern formed at the different process conditions are inspected to detect defects at the instances of the target patterns. The defects detected at different instances of the target pattern may then be correlated with the different process conditions used to form the different instances, which can be used to determine which of the process conditions corresponding to the defects is closest to nominal.

Instances of the target patterns that exhibit defects at process conditions closer to nominal indicate that these instances of the target patterns are more susceptible to defects due to variation in the process conditions than other instances of the target pattern. Therefore, those instances of the target patterns may be of a higher priority to yield of the processes. As such, groups or subgroups that include instances of the target pattern at which the process conditions corresponding to the defects detected therein are closer to nominal than other groups or subgroups may be assigned a higher rank than the other groups or subgroups.

In one particular example, a PWQ wafer may be printed in a lithography process with different focus conditions including nominal (e.g., 0 microns) and modulated focus conditions (e.g., +/−1 micron, +/−2 microns, +/−3 microns, etc.). Defects may be detected in a first group corresponding to, say, a target pattern plus first surrounding patterns, at only modulated focus conditions of +/−3 microns or more. In contrast, defects may be detected in a second group corresponding to, say, the same target pattern plus second surrounding patterns that are different from the first surrounding patterns, at only modulated focus conditions of +/1 micron or more. Therefore, the second group may be assigned a higher priority or rank than the first group because defects appear in the second group at modulated focus conditions closer to nominal.

In another embodiment, the one or more computer subsystems are further configured for classifying the different groups based on one or more characteristics of the different groups and information from a PWQ inspection performed for the design. For example, as described further herein, the number of instances of the target pattern in each group and/or subgroup may be determined. This information may be used in combination with the ranking based on PWQ inspection described further above to classify the groups or subgroups (e.g., as systematic or random). In this manner, the computer subsystem(s) may be configured for identification of potential systematic bins by using groups or sub-groups while leveraging relative distance to nominal conditions and counts in groups or sub-groups. Other characteristic(s) of the different groups or sub-groups such as pattern density and/or complexity in the surrounding patterns may also or alternatively be used with the PWQ inspection results to classify the different groups or subgroups.

Each of the embodiments of the system may be further configured according to any other embodiment(s) described herein.

The embodiments described herein have a number of advantages over other currently used methods and systems for finding patterns in a design for a specimen. For example, by searching and separating the areas by target pattern and surrounding patterns, the inspection sensitivity can be appropriately optimized to generate the optimal sensitivity. In addition, if a target pattern is too small, another grouping method such as design based classification (DBC) or design based grouping (DBG) may be performed based on a larger area to generate inspection care areas. Using two different grouping methods would be especially true for setting up inspection to collect inspection optical signal. However, the embodiments described herein eliminate the need for using two different methods. In addition, the embodiments described herein allow for optimization of optical inspection settings to minimize the impact of the surrounding design. The embodiments described herein are almost required for an efficient operation. In other words, without the embodiments described herein, optimal inspection processes cannot be setup efficiently.

Another embodiment relates to a computer-implemented method for finding patterns in a design for a specimen. The method includes the searching and separating steps described further herein. The searching and separating steps described herein are performed by one or more computer systems, which may be configured as described further herein.

Each of the embodiments of the method described above may include any other step(s) of any other method(s) described herein. Furthermore, each of the embodiments of the method described above may be performed by any of the systems described herein.

All of the methods described herein may include storing results of one or more steps of the method embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

Figure 10:
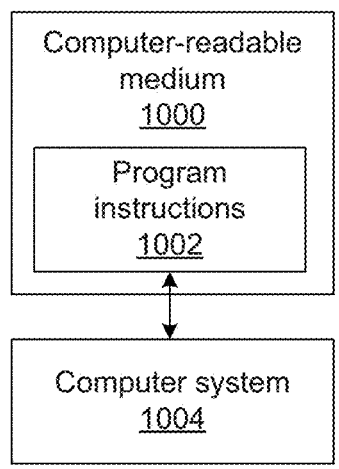
FIG. 10 is a block diagram illustrating one embodiment of a non-transitory computer-readable medium that includes program instructions executable on a computer system for performing one or more of the computer-implemented methods described herein.

An additional embodiment relates to a non-transitory computer-readable medium storing program instructions executable on a computer system for performing a computer-implemented method for finding patterns in a design for a specimen. One such embodiment is shown in FIG. 10. In particular, as shown in FIG. 10, computer-readable medium 1000 includes program instructions 1002 executable on computer system 1004. The computer-implemented method includes the steps of the method described above.

The computer-implemented method for which the program instructions are executable may include any other step(s) described herein.

Program instructions 1002 implementing methods such as those described herein may be stored on computer-readable medium 1000. The computer-readable medium may be a storage medium such as a magnetic or optical disk, or a magnetic tape or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls. C++ objects, JavaBeans, Microsoft Foundation Classes ("MFC"), or other technologies or methodologies, as desired.

The computer system may be configured as described further herein.

Further modifications and alternative embodiments of various aspects of the invention will be apparent to those skilled in the art in view of this description. For example, methods and systems for finding patterns in a design for a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to find patterns in a design for a specimen, comprising:
    an inspection subsystem comprising at least an energy source and a detector, wherein the energy source is configured to generate energy that is directed to a specimen, and wherein the detector is configured to detect energy from the specimen and to generate output responsive to the detected energy; and
    one or more computer subsystems configured for:
        searching for a target pattern in a design for the specimen to thereby find multiple instances of the target pattern in the design;
        separating the multiple instances of the target pattern into different groups based on information for surrounding patterns within a predefined window around the target pattern such that each of the different groups corresponds to a different combination of the target pattern and the surrounding patterns; and
        setting up an inspection process for the specimen based on results of said separating and information for how the surrounding patterns affect the output generated by the detector at locations of the multiple instances on the specimen, wherein the inspection subsystem performs the inspection process on the specimen.

2. The system of claim 1, wherein the surrounding patterns are on the same level of the design as the target pattern.

3. The system of claim 1, wherein at least a portion of the surrounding patterns are on a level of the design other than a level on which the target pattern is located.

4. The system of claim 1, wherein the design that is searched is design data included in a design data file.

5. The system of claim 1, wherein the design that is searched is information for the design obtained from a physical wafer on which at least a portion of the design is printed.

6. The system of claim 1, wherein the information for the surrounding patterns comprises a density, geometry, complexity, vertex count, statistic of perimeters of polygons, mask layer, size, type of polygons, number of polygons, or optical property of the surrounding patterns.

7. The system of claim 1, wherein the information for the surrounding patterns comprises values for two or more characteristics of the surrounding patterns.

8. The system of claim 1, wherein said separating comprises applying one or more rules to the information for the surrounding patterns.

9. The system of claim 1, wherein said separating comprises performing pattern matching based on the target pattern in combination with the surrounding patterns.

10. The system of claim 1, wherein the information for the surrounding patterns comprises values for characteristics of the surrounding patterns, and wherein said separating comprises binning the multiple instances into the different groups based on the values for the characteristics such that each of the different groups corresponds to only a subset of the values for the characteristics of the surrounding patterns.

11. The system of claim 1, wherein said separating comprises binning the multiple instances into the different groups based on the information for the surrounding patterns and binning the multiple instances in one of the different groups into two or more subgroups based on additional information for the surrounding patterns.

12. The system of claim 1, wherein the one or more computer subsystems are further configured for determining one or more characteristics of the multiple instances in at least one of the different groups based on all of the multiple instances in the at least one of the different groups.

13. The system of claim 1, wherein the one or more computer subsystems are further configured for setting up the inspection process for the specimen based on the results of said separating, the information for how the surrounding patterns affect the output generated by the detector at the locations of the multiple instances on the specimen, and information for yield impact of the different combinations of the target pattern and the surrounding patterns on a device fabricated using the design.

14. The system of claim 1, wherein the one or more computer subsystems are further configured for setting up the inspection process for the specimen based on the results of said separating such that at least one of the different groups of the multiple instances is inspected with a different sensitivity than others of the different groups.

15. The system of claim 1, wherein the one or more computer subsystems are further configured for setting up a process to be performed on the specimen by an additional system based on the results of said separating.

16. The system of claim 1, wherein the one or more computer subsystems are further configured for combining two or more of the different groups based on expected output of the detector for the different combinations of the target pattern and the surrounding patterns in the different groups.

17. The system of claim 1, wherein the one or more computer subsystems are further configured for correlating the output generated by the detector at one or more of the multiple instances to output generated by a different system, wherein said correlating is separately performed for each of the different groups.

18. The system of claim 1, wherein the one or more computer subsystems are further configured for ranking the different groups based on information from a process window qualification inspection performed for the design.

19. The system of claim 1, wherein the one or more computer subsystems are further configured for classifying the different groups based on one or more characteristics of the different groups and information from a process window qualification inspection performed for the design.

20. A non-transitory computer-readable medium, storing program instructions executable on a computer system for performing a computer-implemented method for finding patterns in a design for a specimen, wherein the computer-implemented method comprises:

searching for a target pattern in a design for a specimen to thereby find multiple instances of the target pattern in the design;
  separating the multiple instances of the target pattern into different groups based on information for surrounding patterns within a predefined window around the target pattern such that each of the different groups corresponds to a different combination of the target pattern and the surrounding patterns; and
  setting up an inspection process for the specimen based on results of said separating and information for how the surrounding patterns affect the output generated by a detector of an inspection subsystem at locations of the multiple instances on the specimen, wherein the inspection subsystem performs the inspection process on the specimen.

21. A computer-implemented method for finding patterns in a design for a specimen, comprising:

searching for a target pattern in a design for a specimen to thereby find multiple instances of the target pattern in the design;
  separating the multiple instances of the target pattern into different groups based on information for surrounding patterns within a predefined window around the target pattern such that each of the different groups corresponds to a different combination of the target pattern and the surrounding patterns; and
  setting up an inspection process for the specimen based on results of said separating and information for how the surrounding patterns affect the output generated by a detector of an inspection subsystem at locations of the multiple instances on the specimen, wherein the inspection subsystem performs the inspection process on the specimen, and wherein said searching, said separating, and said setting up are performed by one or more computer systems.

* * * * *